US011852719B2

(12) United States Patent
Gulati et al.

(10) Patent No.: US 11,852,719 B2
(45) Date of Patent: Dec. 26, 2023

(54) COORDINATED INTERFERENCE CLEANING WITH KNOWN INTERFERER LOCATION AND TIMING

(71) Applicant: QUALCOMM Incorporated, San Diego, CA (US)

(72) Inventors: Kapil Gulati, Belle Mead, NJ (US); Dan Zhang, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 219 days.

(21) Appl. No.: 17/101,315

(22) Filed: Nov. 23, 2020

(65) Prior Publication Data

US 2022/0163660 A1 May 26, 2022

(51) Int. Cl.
*G01S 13/90* (2006.01)
*G06V 40/10* (2022.01)
(Continued)

(52) U.S. Cl.
CPC ........ *G01S 13/9023* (2013.01); *G01S 7/4056* (2013.01); *G06V 40/10* (2022.01); *H04L 67/12* (2013.01); *G08G 1/166* (2013.01)

(58) Field of Classification Search
CPC .... G01S 13/9023; G01S 7/4056; G01S 7/003; G01S 7/023; G01S 13/343; G01S 13/87;
(Continued)

(56) References Cited

U.S. PATENT DOCUMENTS

2013/0342381 A1* 12/2013 Nakagawa ............. G01S 13/28
342/90
2016/0134314 A1* 5/2016 Yang ....................... G01S 7/023
455/501
(Continued)

FOREIGN PATENT DOCUMENTS

DE 102017216435 A1 3/2019

OTHER PUBLICATIONS

International Search Report and Written Opinion—PCT/US2021/054206—ISA/EPO—dated Jan. 31, 2022.

*Primary Examiner* — Bernarr E Gregory
*Assistant Examiner* — Juliana Cross
(74) *Attorney, Agent, or Firm* — Holland & Hart LLP

(57) ABSTRACT

Methods, systems, and devices for wireless communications are described. User equipment (UE), such as vehicles, may implement radar transmissions to detect and avoid potential collisions with a target such as other UE or pedestrians. A first UE may receive an indication of a location of a second UE and an indication of one or more parameters associated with radar transmission from the second UE. The first UE may also receive a radio frequency waveform that includes a first component associated with the radar transmissions from the second UE and a second component that is associated with reflected radar transmission from the first UE. The first UE may compensate for an interference from the first component based on the location of the second UE and the one or more parameters. The first UE may generate a radar image from the received radio frequency waveform based on compensating for the interference.

30 Claims, 11 Drawing Sheets

(51) Int. Cl.
*G01S 7/40* (2006.01)
*H04L 67/12* (2022.01)
*G08G 1/16* (2006.01)

(58) Field of Classification Search
CPC .................. G01S 13/89; G01S 13/931; G01S 2013/9316; G01S 7/006; G01S 13/003; G01S 7/0232
See application file for complete search history.

(56) References Cited

U.S. PATENT DOCUMENTS

| | | | |
|---|---|---|---|
| 2019/0293748 A1* | 9/2019 | Gulati | ................ H04W 74/004 |
| 2019/0369223 A1 | 12/2019 | Yoshida et al. | |
| 2020/0124699 A1 | 4/2020 | Meissner et al. | |

* cited by examiner

COORDINATED INTERFERENCE CLEANING WITH KNOWN INTERFERER LOCATION AND TIMING

FIELD OF TECHNOLOGY

The following relates to wireless communications, including coordinated interference cleaning with known interferer location and timing.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). In some systems, a wireless device such as a UE (e.g., a vehicle) may experience interference of signals implemented for target detection and collision avoidance. As an example, a wireless device may transmit a radar signal and the radar signal may experience interference with another radar signal from another wireless device, which may result in relatively inaccurate and inefficient target detection.

As more vehicles implement radar, interference between UE may become more common which may obscure or drown out radar reflected from potential collision targets. Such radar transmissions may not include identifying features, such as a signatures, and as such, a UE may have difficulty discerning between interference (e.g., radar pulses from other radar also employing radar pulses for collision avoidance) and radar reflected from a target.

SUMMARY

The described techniques relate to improved methods, systems, devices, and apparatuses that support coordinated interference cleaning with known interferer location and timing. Generally, the described techniques provide for detecting and compensating for interference caused by one or more other user equipment (UE) transmitting radar signals for efficient target detection. In some wireless communications systems (e.g., vehicle-to-everything (V2X) systems) UEs (e.g., vehicles) may transmit one or more indications (e.g., via control signaling, broadcast signaling, information signaling, etc.) of location, speed, or heading and one or more parameters related the UE's radar transmissions such as the frequency offset, frequency pattern, transmission timing, or the like. A receiving UE may receive the indications and identify the received radar signal (e.g., waveform) as interference based on the information provided in the one or more indications. For example, a UE may receive signaling via sidelink that includes information of nearby UEs. Such information may enable the UE to identify interference which may manifest as false peaks on a range spectrum of a received frequency signal. The UE may compensate for the interference, and more easily identify frequency peaks caused by radar reflected from a target on the same range spectrum. For example, a vehicle user equipment may receive an indication of the location of a second vehicle user equipment and an indication of one or more parameters associated with radar transmissions from the second vehicle user equipment and may identify a portion of the range spectrum that is affected by the radar transmissions from the second UE. The UE may remove data points or portions associated with such radar transmissions and generate a radar image that identifies reflected radar from a target.

A method is described. The method may include receiving an indication of a location of a second user equipment (UE) and an indication of one or more parameters associated with radar transmissions from the second UE, receiving a radio frequency waveform including a first component associated with the radar transmissions from the second UE and a second component associated with reflected radar transmissions from the first UE, compensating for an interference from the first component of the received radio frequency waveform based on the location of the second UE and the one or more parameters associated with the radar transmissions from the second UE, and generating a radar image from the received radio frequency waveform based on compensating for the interference from the first component of the received radio frequency waveform.

An apparatus is described. The apparatus may include a processor, memory in electronic communication with the processor, and instructions stored in the memory. The instructions may be executable by the processor to cause the apparatus to receive an indication of a location of a second UE and an indication of one or more parameters associated with radar transmissions from the second UE, receive a radio frequency waveform including a first component associated with the radar transmissions from the second UE and a second component associated with reflected radar transmissions from the first UE, compensate for an interference from the first component of the received radio frequency waveform based on the location of the second UE and the one or more parameters associated with the radar transmissions from the second UE, and generate a radar image from the received radio frequency waveform based on compensating for the interference from the first component of the received radio frequency waveform.

Another apparatus is described. The apparatus may include means for receiving an indication of a location of a second UE and an indication of one or more parameters associated with radar transmissions from the second UE, means for receiving a radio frequency waveform including a first component associated with the radar transmissions from the second UE and a second component associated with reflected radar transmissions from the first UE, means for compensating for an interference from the first component of the received radio frequency waveform based on the location of the second UE and the one or more parameters associated with the radar transmissions from the second UE, and means for generating a radar image from the received radio frequency waveform based on compensating for the interference from the first component of the received radio frequency waveform.

A non-transitory computer-readable medium storing code is described. The code may include instructions executable by a processor to receive an indication of a location of a second UE and an indication of one or more parameters associated with radar transmissions from the second UE, receive a radio frequency waveform including a first component associated with the radar transmissions from the second UE and a second component associated with reflected radar transmissions from the first UE, compensate for an interference from the first component of the received radio frequency waveform based on the location of the second UE and the one or more parameters associated with the radar transmissions from the second UE, and generate a radar image from the received radio frequency waveform based on compensating for the interference from the first component of the received radio frequency waveform.

In some examples of the method, apparatuses, and non-transitory computer-readable medium described herein, compensating for the interference may include operations, features, means, or instructions for generating a frequency spectrum based on the received radio frequency waveform, identifying a portion of the frequency spectrum that includes the interference from the first component of the received radio frequency waveform based on the location of the second UE and the one or more parameters associated with the radar transmissions from the second UE, and removing the identified portion from the frequency spectrum.

Some examples of the method, apparatuses, and non-transitory computer-readable medium described herein may further include operations, features, means, or instructions for removing the identified portion from the frequency spectrum includes nulling the identified portion of the frequency spectrum.

Some examples of the method, apparatuses, and non-transitory computer-readable medium described herein may further include operations, features, means, or instructions for nulling the identified portion of the frequency spectrum includes setting values of the identified portion of the frequency spectrum to zero.

Some examples of the method, apparatuses, and non-transitory computer-readable medium described herein may further include operations, features, means, or instructions for nulling the identified portion of the frequency spectrum includes setting values of the identified portion of the frequency spectrum to a random variable based on a noise level of the frequency spectrum.

In some examples of the method, apparatuses, and non-transitory computer-readable medium described herein, the frequency spectrum includes a doppler frequency spectrum, a direction of arrival frequency spectrum, a range spectrum, or a combination thereof.

Some examples of the method, apparatuses, and non-transitory computer-readable medium described herein may further include operations, features, means, or instructions for identifying a target based on compensating for the interference associated with the radar transmissions from the second UE.

In some examples of the method, apparatuses, and non-transitory computer-readable medium described herein, the reflected radar transmissions from the first UE may be reflected from the target.

In some examples of the method, apparatuses, and non-transitory computer-readable medium described herein, the indication of the location of the second UE and the indication of the one or more parameters associated with the radar transmissions from the second UE may be received via a sidelink channel.

In some examples of the method, apparatuses, and non-transitory computer-readable medium described herein, the indication of the location of the second UE includes global positioning system signaling from the second UE, an explicit indication of the location from the second UE, an indication of a synchronized transmission timing between the first UE and the second UE, or a combination thereof.

In some examples of the method, apparatuses, and non-transitory computer-readable medium described herein, the radar transmissions from the second UE include a frequency modulated continuous wave and the one or more parameters associated with the radar transmissions from the second UE include one or more of a frequency ramp direction of the frequency modulated continuous wave, a start frequency of the frequency modulated continuous wave, a transmission start time of the frequency modulated continuous wave, or a duration of each pulse of the frequency modulated continuous wave.

In some examples of the method, apparatuses, and non-transitory computer-readable medium described herein, the one or more parameters indicate a velocity of the second UE or a direction of arrival of the second UE.

Some examples of the method, apparatuses, and non-transitory computer-readable medium described herein may further include operations, features, means, or instructions for transmitting a frequency modulated continuous wave including a number of frequency sweep chirps.

In some examples of the method, apparatuses, and non-transitory computer-readable medium described herein, the reflected radar transmissions from the first UE include a reflection of the number of frequency sweep chirps.

A method for wireless communication at a first UE is described. The method may include receiving an indication of a location of a second UE and an indication of one or more parameters associated with radar transmissions from the second UE, receiving a radio frequency waveform including a first component associated with the radar transmissions from the second UE and a second component associated with reflected radar transmissions from the first UE, compensating for an interference from the first component of the received radio frequency waveform based on the location of the second UE and the one or more parameters associated with the radar transmissions from the second UE, and generating a radar image from the received radio frequency waveform based on compensating for the interference from the first component of the received radio frequency waveform.

An apparatus for wireless communication at a first UE is described. The apparatus may include a processor, memory in electronic communication with the processor, and instructions stored in the memory. The instructions may be executable by the processor to cause the apparatus to receive an indication of a location of a second UE and an indication of one or more parameters associated with radar transmissions from the second UE, receive a radio frequency waveform including a first component associated with the radar transmissions from the second UE and a second component associated with reflected radar transmissions from the first UE, compensate for an interference from the first component of the received radio frequency waveform based on the location of the second UE and the one or more parameters associated with the radar transmissions from the second UE, and generate a radar image from the received radio frequency waveform based on compensating for the interference from the first component of the received radio frequency waveform.

Another apparatus for wireless communication at a first UE is described. The apparatus may include means for receiving an indication of a location of a second UE and an indication of one or more parameters associated with radar transmissions from the second UE, means for receiving a radio frequency waveform including a first component associated with the radar transmissions from the second UE and a second component associated with reflected radar transmissions from the first UE, means for compensating for an interference from the first component of the received radio frequency waveform based on the location of the second UE and the one or more parameters associated with the radar transmissions from the second UE, and means for generating a radar image from the received radio frequency waveform based on compensating for the interference from the first component of the received radio frequency waveform.

A non-transitory computer-readable medium storing code for wireless communication at a first UE is described. The code may include instructions executable by a processor to receive an indication of a location of a second UE and an indication of one or more parameters associated with radar transmissions from the second UE, receive a radio frequency waveform including a first component associated with the radar transmissions from the second UE and a second component associated with reflected radar transmissions from the first UE, compensate for an interference from the first component of the received radio frequency waveform based on the location of the second UE and the one or more parameters associated with the radar transmissions from the second UE, and generate a radar image from the received radio frequency waveform based on compensating for the interference from the first component of the received radio frequency waveform.

A method is described. The method may include receiving an indication of a location of a second UE and an indication of one or more parameters associated with radar transmissions from the second UE, receiving radio frequency waveform including a first component associated with the radar transmissions from the second UE and a second component associated with reflected radar transmissions from the first UE, compensate for an interference from the first component of the receiving radio frequency waveform based on the location of the second UE and the one or more parameters associated with the radar transmissions from the second UE, and generating a radar image from the received radio frequency waveform based on compensating for the interference from the first component of the received radio frequency waveform.

An apparatus is described. The apparatus may include a processor, memory in electronic communication with the processor, and instructions stored in the memory. The instructions may be executable by the processor to cause the apparatus to receive an indication of a location of a second UE and an indication of one or more parameters associated with radar transmissions from the second UE, receive radio frequency waveform including a first component associated with the radar transmissions from the second UE and a second component associated with reflected radar transmissions from the first UE, compensate for an interference from the first component of the received radio frequency waveform based on the location of the second UE and the one or more parameters associated with the radar transmissions from the second UE, and generate a radar image from the received radio frequency waveform based on compensating for the interference from the first component of the received radio frequency waveform.

Another apparatus is described. The apparatus may include means for receiving an indication of a location of a second UE and an indication of one or more parameters associated with radar transmissions from the second UE, means for receiving radio frequency waveform including a first component associated with the radar transmissions from the second UE and a second component associated with reflected radar transmissions from the first UE, means for compensate for an interference from the first component of the receiving radio frequency waveform based on the location of the second UE and the one or more parameters associated with the radar transmissions from the second UE, and means for generating a radar image from the received radio frequency waveform based on compensating for the interference from the first component of the received radio frequency waveform.

A non-transitory computer-readable medium storing code is described. The code may include instructions executable by a processor to receive an indication of a location of a second UE and an indication of one or more parameters associated with radar transmissions from the second UE, receive radio frequency waveform including a first component associated with the radar transmissions from the second UE and a second component associated with reflected radar transmissions from the first UE, compensate for an interference from the first component of the received radio frequency waveform based on the location of the second UE and the one or more parameters associated with the radar transmissions from the second UE, and generate a radar image from the received radio frequency waveform based on compensating for the interference from the first component of the received radio frequency waveform.

DETAILED DESCRIPTION

Figure 1:
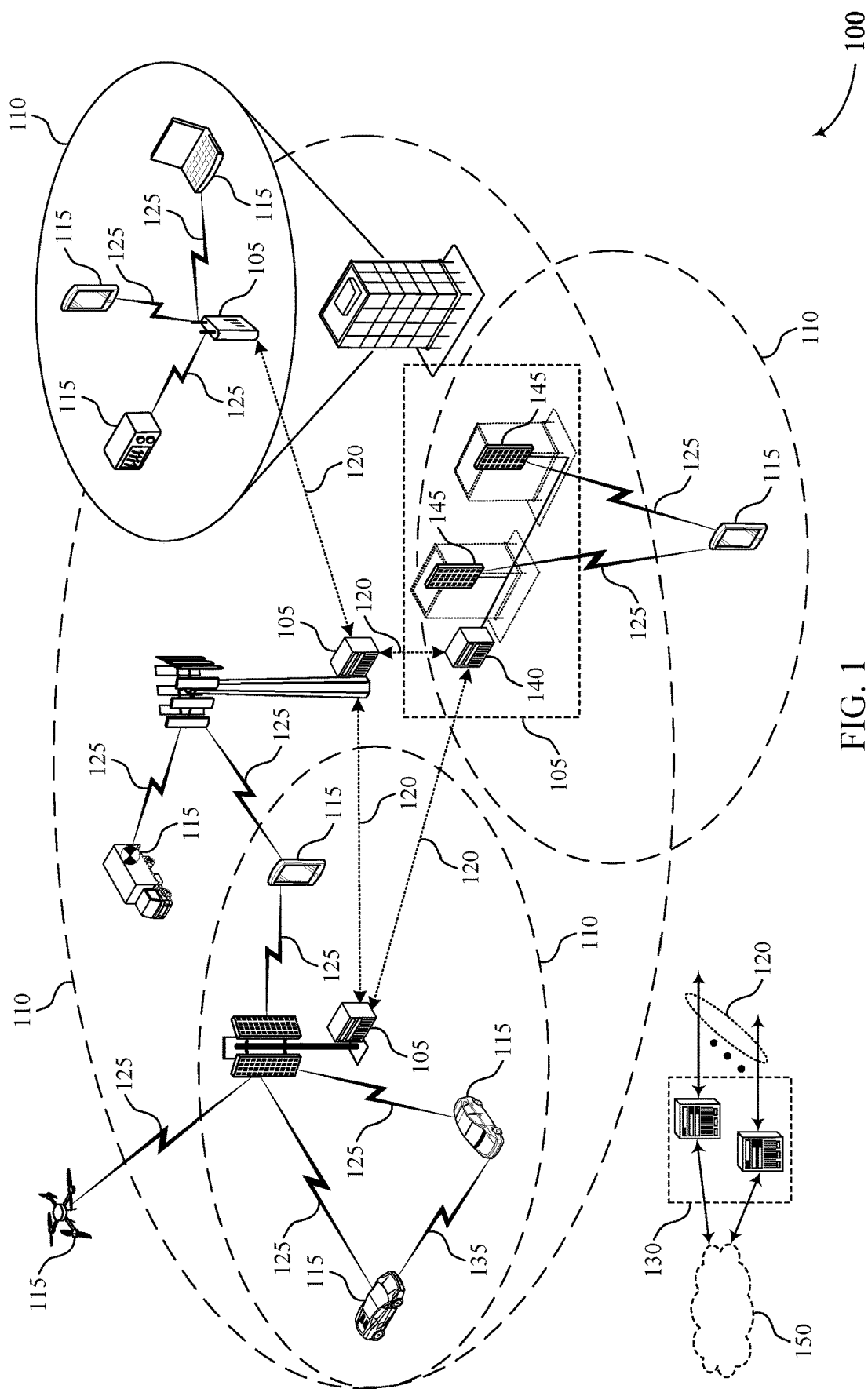
FIG. 1 illustrates an example of a wireless communications system that supports coordinated interference cleaning with known interferer location and timing in accordance with aspects of the present disclosure.

Frequency Modulated Continuous Wave (FMCW) radar mode may be implemented in a wide range of applications including vehicle ranging for target detection and the like. In some examples, FMCW radar may be employed by a user equipment (UE) operating in a full duplex mode supporting simultaneous uplink and downlink transmissions in a same time period. For example, vehicle-based UE may transmit FMCW radar to detect potential targets and avoid collisions with the detected target. In some cases, other vehicle-based UEs in the vicinity of a receiving UE may also transmit FMCW radar which may potentially cause interference that may obscure or overwhelm radar reflected from the target, preventing the UE from readily identifying the target and its location.

FMCW radar may include a number of frequency chirps transmitted over a range of frequencies. For example, a single chirp may be initiated at a starting frequency. The chirp may sweep through the frequency range in a first direction (e.g., increasing ramp or decreasing ramp) before changing direction and sweeping through the frequency range until the starting frequency is reached at which point a second similar chirp may begin. An FMCW may include a large number of chirps that sweep through the frequency range. After some time, the transmitting UE may receive chirps reflected from a potential target where the time elapsed between transmitting the FMCW chirp and receiving the reflected chirp is proportional to the range or distance of the target. For example, a UE may receive the reflected FMCW radar and produce a range spectrum for identifying potential targets. In addition to or alternatively to producing the range spectrum, the UE may produce a Doppler spectrum for identifying a velocity of the target and a direction of arrival (DoA) spectrum for identifying a direction of motion of the target. The UE may use the one or more spectrums to identify and potentially prevent a collision with the target.

In some cases, when producing the one or more spectrums, a UE may include signal waveforms received from another UE that is also transmitting radar. This received waveform may be considered interference. In some cases, the interfering UE may also transit FMCW and may sweep in the same or different direction as the receiving UE. For example, the interfering UE and the receiving UE may both transmit FMCW chirps that sweep through increasing frequencies before sweeping through decreasing frequencies or vice versa. In such cases, the radar received from the interfering UE may be included in the one or more spectrums as a false peak sometimes known as a ghost target or a false peak. In some examples, the false peak may be caused by strong interference and may overwhelm or mask a target peak. This may prevent or obstruct a UE from efficiently identifying the target. In some examples, the interfering UE and the receiving UE may transmit FMCW chirps that sweep through the frequency range (e.g., frequency ramp) in opposite directions which may cause wideband noise on the one or more spectrums and may also prevent or obstruct a UE from efficiently identifying the target. This interference may be mistaken by the receiving UE as a target radar return or may mask out the target radar return. However, a UE may be able to communicate with the interfering UE through one or more vehicle-to-everything (V2X) channels to coordinate radar transmission and compensate for interference caused by false targets.

For example, an interfering UE may transmit one or more indications of radar transmission timing, one or more chirp parameters, (e.g., direction of sweep (e.g., ramp), starting frequency, and the like), etc. through a V2X interface (e.g., PC5) to a receiving UE. The receiving UE may calculate one or more spectrums (e.g., range, Doppler, or DoA) by receiving radar from the interfering UE and any potential targets and may predict where a false peak may occur on the one or more spectrums using information provided by the one or more indications transmitted by the interfering UE. The receiving UE may adjust a single spectrum or multiple spectrums to compensate for the identified false peak by removing the data points caused by the interference. For example, the receiving UE may set the interference data points to zero or a random variable corresponding to a level of noise of the received radar, among other techniques. Such techniques may be referred to as nulling the interference. The receiving UE may use the adjusted one or more spectrums along with any unadjusted spectrums to generate a radar image for more readily identifying potential targets.

Aspects of the disclosure are initially described in the context of wireless communications systems. Aspects of the disclosure are then described in the context of systems and signal processing schemes. Aspects of the disclosure are further illustrated by and described with reference to apparatus diagrams, system diagrams, and flowcharts that relate to coordinated interference cleaning with known interferer location and timing.

FIG. 1 illustrates an example of a wireless communications system 100 that supports coordinated interference cleaning with known interferer location and timing in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may transmit FMCW radar in full duplex mode in a wide range of applications including vehicle ranging for target detection and the like. The UE 115 may receive a number of indications from one or more other UE 115 via V2X communications among other examples. The indications may include information regarding a location of the other UE 115 and one or more parameters associated with radar transmissions originating from the other UE 115. For example, the UE 115 may receive an indication of the other UEs location including global positioning system (GPS) data or positioning functions, an indication of range associated with the radar of the other UE 115, an indication of one or more of a frequency ramp direction of the FMCW transmitted by the other UE 115, a start frequency of the FMCW transmitted by the other UE 115, a transmission start time of the FMCW transmitted by the other UE 115, or a duration of each pulse of the FMCW or may receive synchronization information for synchronizing the radar of the UE 115 with the radar of the other UE 115. The UE 115 may also receive a radio frequency waveform (e.g., FMCW radar) including radar transmissions from the other UE 115 and may receive reflected radar transmissions from the first UE that are reflected by a target.

The UE 115 may generate a frequency spectrum based on the received radio frequency waveform. For example, a UE 115 may generate a range spectrum, a Doppler spectrum, or a DoA spectrum. The UE 115 may identify portions of the spectrum that are caused due to interference based on the indications received from the other UE 115 and may modify the frequency spectrum to compensate for the interference. For example, the UE 115 may remove data points associated with the interference, set the data points to zero, or may set the data points to a random value based on a noise level of the frequency spectrum. The UE 115 may generate a radar image based on the modified frequency spectrum which may suppress false targets caused by interference. The UE 115 may be more readily able to identify a target from the radar image generated by the modified frequency spectrum than from a radar image generated without compensating for the interference.

Figure 2:
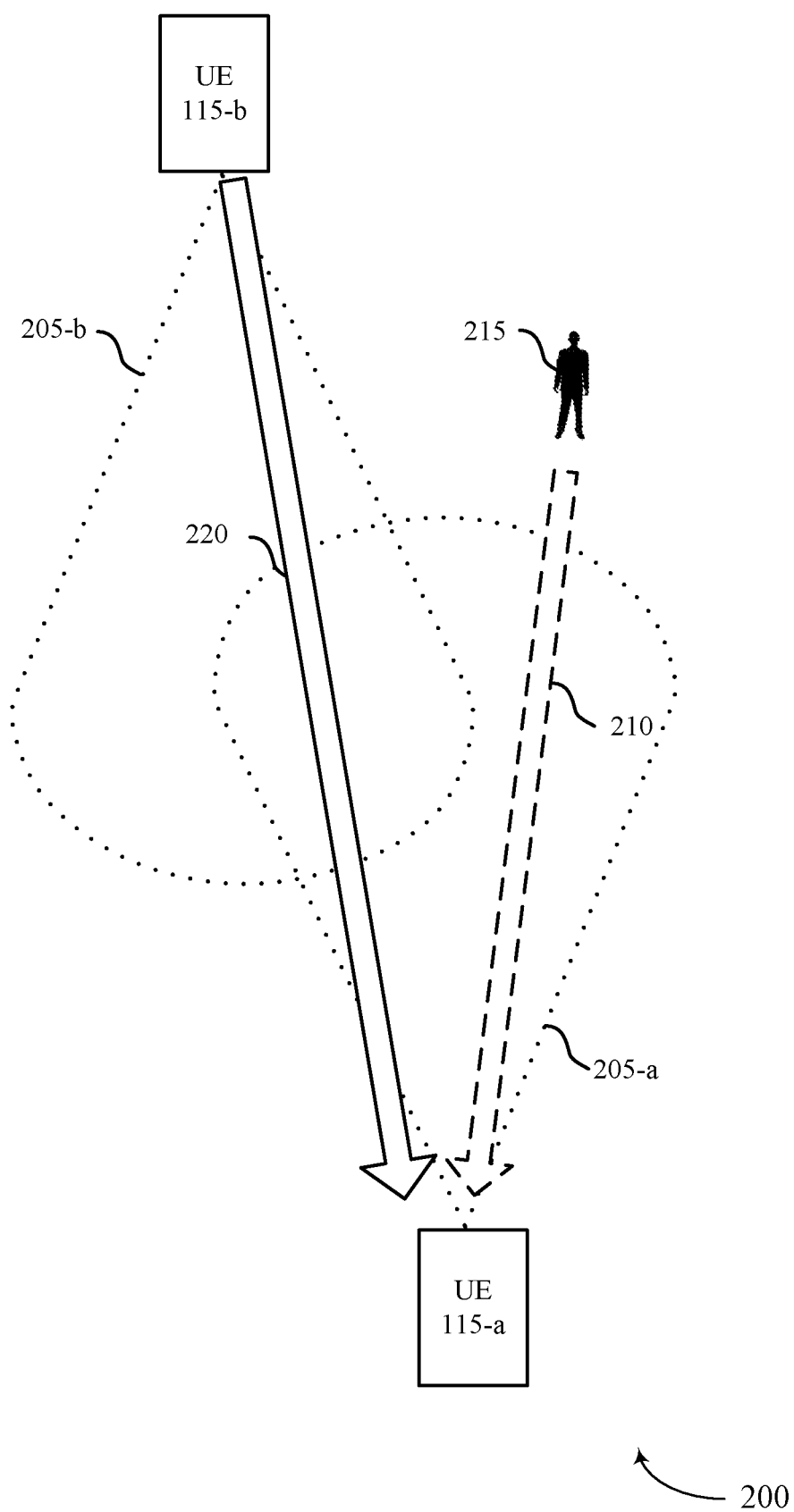
FIG. 2 illustrates an example of a wireless communications system that supports coordinated interference cleaning with known interferer location and timing in accordance with aspects of the present disclosure.

FIG. 2 illustrates an example of a wireless communications system 200 that supports coordinated interference cleaning with known interferer location and timing in accordance with aspects of the present disclosure. In some examples, wireless communications system 200 may implement aspects of wireless communications system 100. For instance, wireless communications system 200 includes UEs 115-a and 115-b, which may be examples of a UE 115 described with reference to FIG. 1. Wireless communications system 200 also includes target 215. In some examples, the wireless communications system 200 may implement aspects of the wireless communications system 100. For example, UE 115-a in the wireless communications system 200 may implement communications for coordinated interference cleaning with known interferer location and timing.

The UE 115-a and the UE 115-b may transmit signals 205-a and 205-b, respectively. In some cases, the UE 115-a may transmit the signal 205-a and the UE 115-b may transmit the signal 205-b in a full duplex mode (e.g., data or radar signals may be transmitted and received simultaneously at the UE 115-a or the UE 115-b). In some cases, the UE 115-b may transmit sidelink signaling 220 to the UE 115-a. As an illustrative example, the signals 205-a and 205-b may be an example of a FMCW radar signal, which may enable the UE 115-a with various functionalities (e.g., ranging, environmental and object detection, automated driving, etc.). However, in some examples, the signal 205-a and the signal 205-b may interfere with each other or other signals 205. For instance, the UE 115-a may be an example of a vehicle moving towards the UE 115-b. The UE 115-b may be transmitting the signal 205-b (e.g., a FMCW radar signal) at a time or on resources that the UE 115-a is transmitting the signal 205-a. In such examples, the signal 205-b may cause relatively strong interference to the signal 205-a from the UE 115-a (e.g., the signal 205-b may obscure the reception of a reflected signal 210), which may degrade ranging accuracy and object detection (e.g., detection of target 215).

Accordingly, the techniques described herein may enable the UEs 115 to implement interference cleaning operations, for example, in a radar system, which may reduce the impact of interference in the system 200 and result in more efficient target detection. Additionally or alternatively, the UEs 115 may implement one or more nulling processes that account for radar interference on a frequency spectrum (e.g., range spectrum, Doppler spectrum, DoA spectrum). For example, the UE 115-a may perform a nulling procedure by identifying interference caused by the signal 205-b based on information received via the sidelink signaling 220 and removing data points associated with the interference, which may result in relatively more accurate target detection.

The UE 115-b may transmit an indication of its location to the UE 115-a via the sidelink signaling 220. For example, the indication of the location of the UE 115-b may include GPS signaling, an explicit indication of the location, an indication of a synchronized transmission timing between the UE 115-a and the UE 115-b, or any combination thereof. The UE 115-a, may additionally or alternatively, receive from the UE 115-b, an indication of a set of transmission parameters for a transmit waveform of the signal 205-b. In some examples, the transmission parameters may be an example of "chirp" parameters for a cycle of a FMCW radar signal. In some examples, the transmission parameters may include a starting frequency, a bandwidth sweep range (e.g., the waveform may be transmitted across a 1 GHz range, a 1.5 GHz range, among other examples of bandwidth sweep ranges), a sweeping time (e.g., the UE 115-a may complete a bandwidth sweep of the waveform in 2 microseconds, 6 microseconds, 12 microseconds, etc.), a direction of a sweep (e.g., a chirp of the waveform may be directed from a higher frequency to a lower frequency, or vice versa), among other examples of transmission parameters. In some cases, the indication of the location, the indication of the one or more parameters or both may be received from a roadside UE (not shown) and may indicate information about the UE 115-b. The UE 115-a may utilize the location of the UE 115-b and the set of parameters to identify interference caused by the signal 205-b.

For example, the UE 115-a may receive radar signal 205-b and may also receive reflected radar signal 210 that is reflected by target 215. Without prior knowledge from the UE 115-b, the UE 115-a may be unable to determine whether the received radar signal is from its own echo (e.g., reflected signal 210) or from interference (e.g., radar signal 205-b). However, based on the indication of the location or the indication of the one or more parameters, or both, the UE 115-a may determine portions of a frequency spectrum that are caused by interference.

For example, the UE 115-b may be at a distance from the UE 115-a. The UE 115-a may determine the distance and a transmission power of the UE 115-b based on the indication of the location or the indication of the one or more parameters, or both. Based on the location and transmission power information the UE 115-a may be able to predict a corresponding peak on a frequency spectrum. For example, the frequency spectrum may show two peaks which may be caused by objects at a same distance from the UE 115-a where the objects may be the target 215, the interfering UE 115-b, or both. In some cases, one of the peaks may have a strength that corresponds to the peak strength of the interferer that is estimated based on the received indications where the second peak may be smaller because the second peak may be caused by the reflected signal. In such cases, the stronger peak may be associated with the UE 115-b and the weaker peak may be identified as a target 215, such as a pedestrian. In some cases, a false peak may be identified based on an estimated distance of the UE 115-b corresponding to a false peak, among other aspects. The UE 115-a may generate a frequency spectrum for each chirp of the signal 205-a.

Based on identifying that one or more peaks of a frequency spectrum are caused by interference the UE 115-a may null the portions of the frequency spectrum caused by interference such that true targets may be more readily identified. For example, the UE 115-a may reduce the peak caused by interference. For example, the UE 115-a may replace the data points associated with the interference with zero or may replace the data points with a random variable in accordance with a noise level. In some cases, white noise may be added to compensate for the interference in a process known as dithering.

Based on compensating for the interference in the frequency spectrum, the UE 115-a may generate a radar image. For example, the UE 115-a may perform a fast Fourier transform (FFT) on each of a number of frequency spectrums to generate a 3D radar image. As a non-limiting example, the UE 115-a may compensate for interference in a range spectrum, perform an FFT on the range spectrum, perform an FFT on a doppler spectrum, and then performs an FFT on a DoA spectrum where each of the spectrums are produced by receiving the signal 205-b and the reflected signal 210. Based on compensating for the interference, the radar image may be less affected by interference from the UE 115-b and the target may be more readily identifiable. The UE 115-a may identify the target based on the radar image and may estimate a location, speed, and direction of travel of the target 215. The UE 115-a may avoid a collision with the target 215 based on these parameters.

Figure 3:
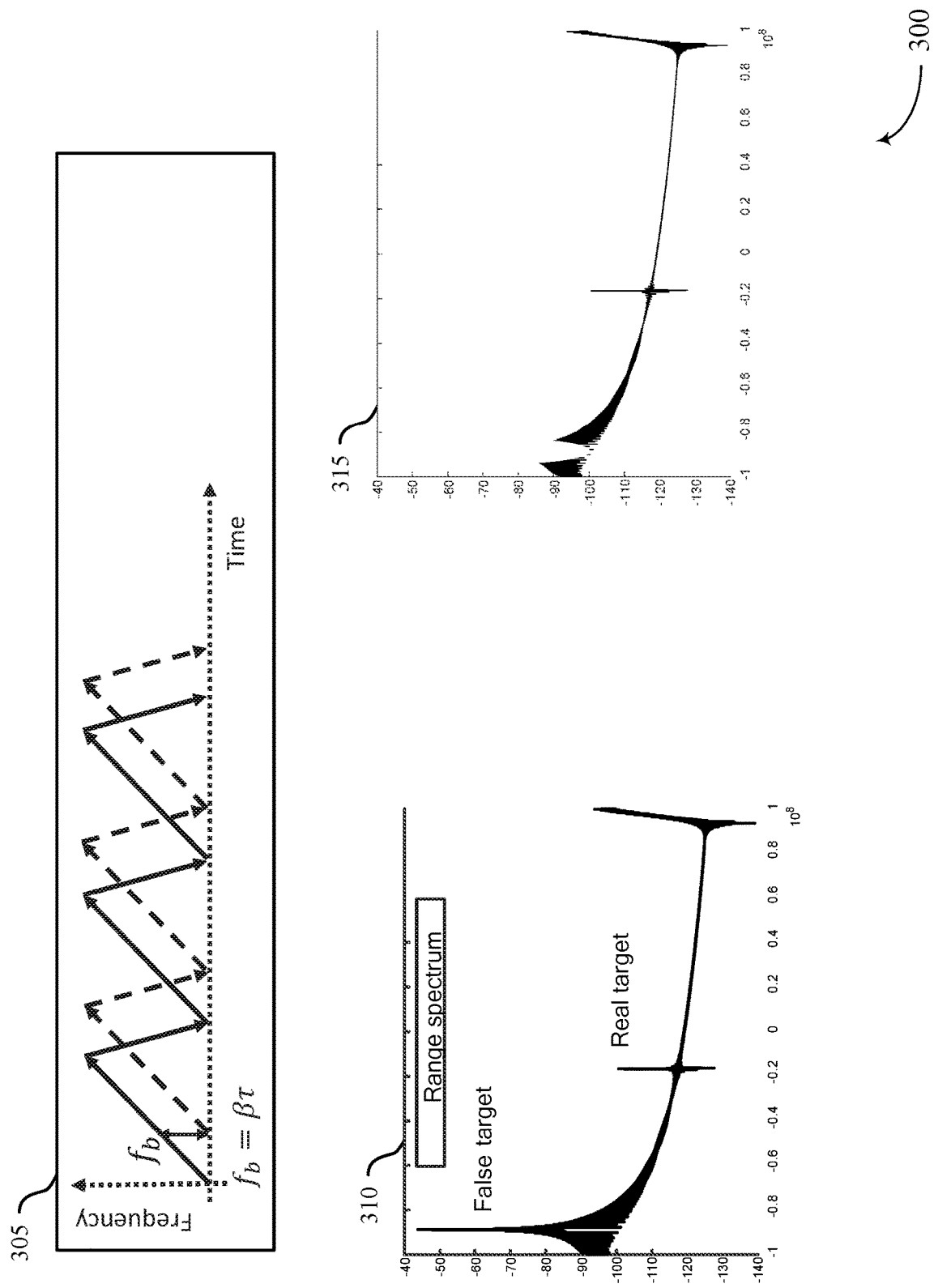
FIG. 3 illustrates an example of a signal processing scheme that supports coordinated interference cleaning with known interferer location and timing in accordance with aspects of the present disclosure.

FIG. 3 illustrates an example of a signal processing scheme 300 that supports coordinated interference cleaning with known interferer location and timing in accordance with aspects of the present disclosure. The signal processing scheme may include a frequency time graph 305 showing a transmitted FMCW as well as a reflected FMCW, a first range spectrum 310 and a second range spectrum 315 which may be examples of a frequency spectrum as described with reference to FIG. 2.

The frequency time graph 305 shows an example of a number of pulses of an FMCW which may otherwise be known as chirps. A UE, for example a UE 115 as described with reference to wireless communications systems 100 and 200, may estimate an instantaneous frequency Δ by measuring a difference in frequency at a time between a transmitted FMCW and a reflected FMCW. For example, the instantaneous frequency delta may also be known as a beat frequency and denoted by $f_b=\beta\tau$, where τ is the delay between transmitting the FMCW chirp and receiving the reflected FMCW chirp, and β is the slope of the frequency sweep of the chirp. Based on the instantaneous frequency Δ the UE may be able to calculate or estimate τ, which may be proportional to the distance of the target. In some cases, the received signal may be received from other UE transmitting a radar signal and may cause interference at the UE.

In some examples, based on measuring the instantaneous frequency delta, the UE may generate a range spectrum 310. The range spectrum 310 illustrates a peak caused by a false target which may be caused, for example, by a radar signal or waveform received from other UE in the vicinity of the receiving UE and a real target caused by the reflected radar signal from the receiving UE. In cases where the UE measures an instantaneous frequency delta for the signal that is interference from another UE, the range spectrum may include a large peak that may drown out or obscure a peak caused by measuring the instantaneous frequency delta of the waveform signal reflected by a target.

Figure 4:
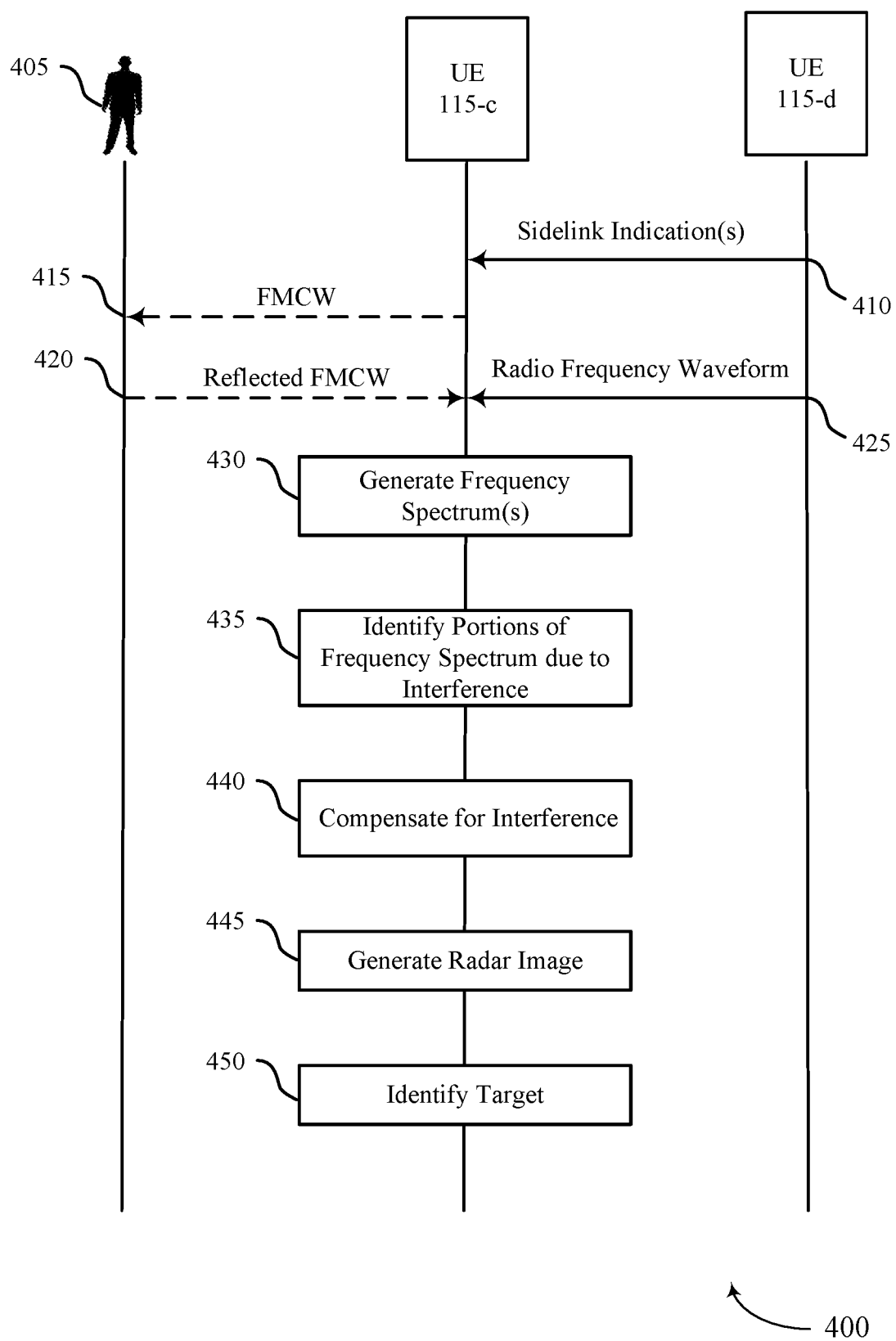
FIG. 4 illustrates an example of a process flow that supports coordinated interference cleaning with known interferer location and timing in accordance with aspects of the present disclosure.

As described herein with reference the FIG. 2, the UE may use one or more indications received from an interfering UE to mitigate the false target. For example, range spectrum 315 shows an example in which the UE has adjusted the data points identified as associated with interference. The UE may adjust the data points by setting the data to zero, setting the data points to a random variable, or by various other methods. In any case, the UE dampens the peak caused by the false target to more efficiently identify the peak caused by the real target FIG. 4 illustrates an example of a process flow 400 that supports coordinated interference cleaning with known interferer location and timing in accordance with aspects of the present disclosure. In some examples, the process flow 400 may implement aspects of wireless communications systems 100 and 200. Process flow 400 includes UE 115-c, UE 115-d and target 405.

In the following description of the process flow 400, the operations between the UE 115-c, the UE 115-d, and the target 405 may be transmitted (e.g., transmitted from a UE 115 or reflected from the target 405) in a different order than the exemplary order shown, or the operations performed by the UE 115-c, and the UE 115-d may be performed in different orders or at different times. Certain operations may also be left out of the process flow 400, or other operations may be added to the process flow 400. It is to be understood that while the UE 115-c and the UE 115-d are shown performing a number of the operations of process flow 400, any wireless device (e.g., a base station 105 as described with reference to FIG. 1) may perform the operations shown. Process flow 400 may illustrate coordinated interference cleaning with known interferer location and timing.

At 410, the UE 115-c may receive one or more sidelink indications from the UE 115-d. For example, the UE 115-d may inform the UE 115-c of its location, transmission timing, chirp parameters or any combination thereof. In some cases, the one or more sidelink indications may be transmitted via V2X signaling (e.g., broadcast signaling, groupcast signaling, unicast signaling, control signaling, or the like). In some cases, the UE 115-d may transmit an indication of its location using GPS signaling, an explicit indication of the location from the second UE, an indication of a synchronized transmission timing between the first UE and the second UE, or a combination thereof. The UE 115-d may, in some cases, also transmit an indication of one or more parameters associated with its transmitted radar waveform including one or more of the timing of the radar transmissions (e.g., a time at which the radar transmission or the FMCW wave begins), a start frequency of the chirps in the FMCW wave, a sweep direction of the chirps, a duration of each chirp, or any combination thereof.

At 415, The UE 115-c may transmit a FMCW (e.g., a radio frequency waveform) which may reach the target 405 and be reflected back to the UE 115-c at 420.

At 425, The UE 115-c may receive a radio frequency waveform from the UE 115-d. For example, the UE 115-d may also be transmitting a FMCW for ranging and target detection. The UE 115-c may receive the interfering FMCW along with the reflected FMCW and, at 430, may generate a frequency spectrum based on the received waveform. In some cases, the UE may generate a range spectrum, a doppler spectrum, a DoA spectrum, or any combination thereof. The spectrum may include a false peak due to a frequency waveform from the UE 115-d and may include a real peak due to the waveform reflected from the target. The UE 115-c may not be able to identify the real target if the interference comprising the false target is strong or is mistaken as radar return.

At 435, the UE 115-c may identify portions of the frequency spectrum that are caused by interference from the UE 115-d. For example, based on the sidelink indications received from the UE 115-d, the UE 115-c may be able to estimate the location of false peaks caused by the UE 115-d on the frequency spectrum based on the sidelink indications. In some cases, the UE 115-c may estimate the false peak location based on a probabilistic data-association algorithm. In some cease, the UE 115-c may be able to estimate the range (e.g., transmission power coverage) of the UE 115-d and thus estimate the signal strength which the UE 115-c may use to calculate an SNR associated with the interfering radar and may extrapolate an uncertainty of the location of the false peak on the frequency spectrum.

At 440, the UE 115-c, based on identifying the location of the false peak on the frequency spectrum, may attenuate the frequency data to suppress or eliminate a false peak that is caused by interference from the UE 115-d. For example, the UE 115-c may identify a false peak and may set the one or more data points associated with the false peak to zero which may also be known as nulling. In some other examples, the UE 115-d may set the data points to a random value at a noise level associated with the received radar waveform such that the false peak is removed or attenuated. In some case, the UE 115-c may otherwise attenuate the false peak such that a real peak or real target is more readily identifiable.

At 445, the UE 115-d may generate a radar image based on the modified or attenuated frequency spectrum. In some cases, a radar image may be generated based on a single frequency spectrum which may otherwise be known as a 1D radar image. In other cases, the radar image may be generated based on 2 or more frequency spectrums that have also been modified based on identifying the false peak (e.g., 2D range spectrum, 3D range spectrum, etc.). In some cases, a real peak may be more easily discerned based on generating the radar image using multiple modified frequency spectrums.

At 450, the UE 115-c may identify the target 405 based on generating the radar image. For example, the radar image may exclude false peaks due to interference caused by the UE 115-d which may allow the UE 115-c to identify frequency peaks caused by the FMCW radar reflected at 420 thereby identifying the target 405.

Figure 5:
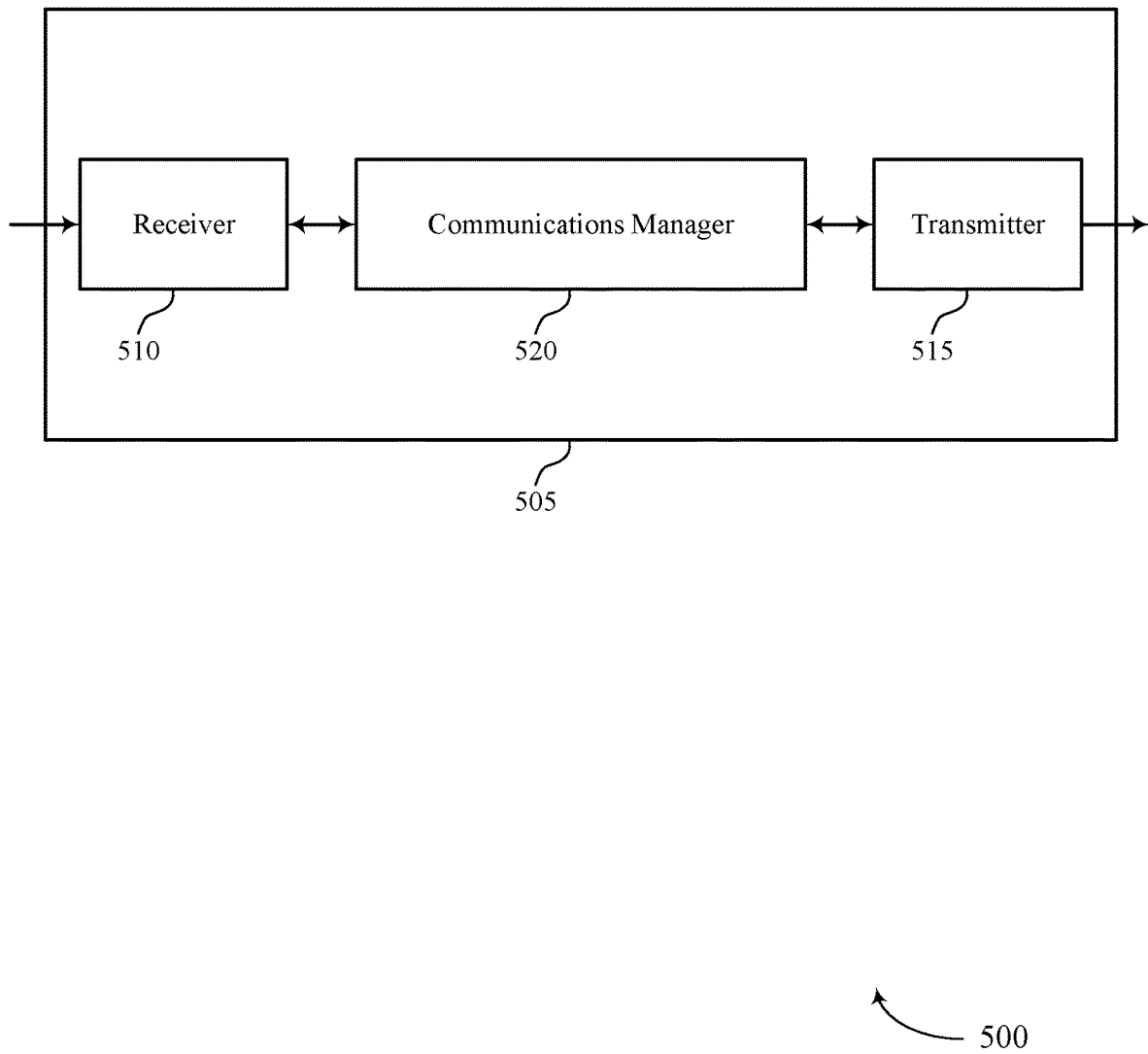
FIGS. 5 and 6 show block diagrams of devices that support coordinated interference cleaning with known interferer location and timing in accordance with aspects of the present disclosure.

FIG. 5 shows a block diagram 500 of a device 505 that supports coordinated interference cleaning with known interferer location and timing in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to coordinated interference cleaning with known interferer location and timing). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to coordinated interference cleaning with known interferer location and timing). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of coordinated interference cleaning with known interferer location and timing as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

For example, the communications manager 520 may be configured as or otherwise support a means for receiving an indication of a location of a second UE and an indication of one or more parameters associated with radar transmissions from the second UE. The communications manager 520 may be configured as or otherwise support a means for receiving a radio frequency waveform including a first component associated with the radar transmissions from the second UE and a second component associated with reflected radar transmissions from the first UE. The communications manager 520 may be configured as or otherwise support a means for compensating for an interference from the first component of the received radio frequency waveform based on the location of the second UE and the one or more parameters associated with the radar transmissions from the second UE. The communications manager 520 may be configured as or otherwise support a means for generating a radar image from the received radio frequency waveform based on compensating for the interference from the first component of the received radio frequency waveform.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for enhanced target detection. One implementation may allow a UE 115 to save power and increase battery life by efficiently detecting interference associated with one or more interfering UE 115. Another implementation may provide improved quality and reliability of service at the UE 115, as a target may be more readily identified through receiving sidelink indications.

Figure 6:
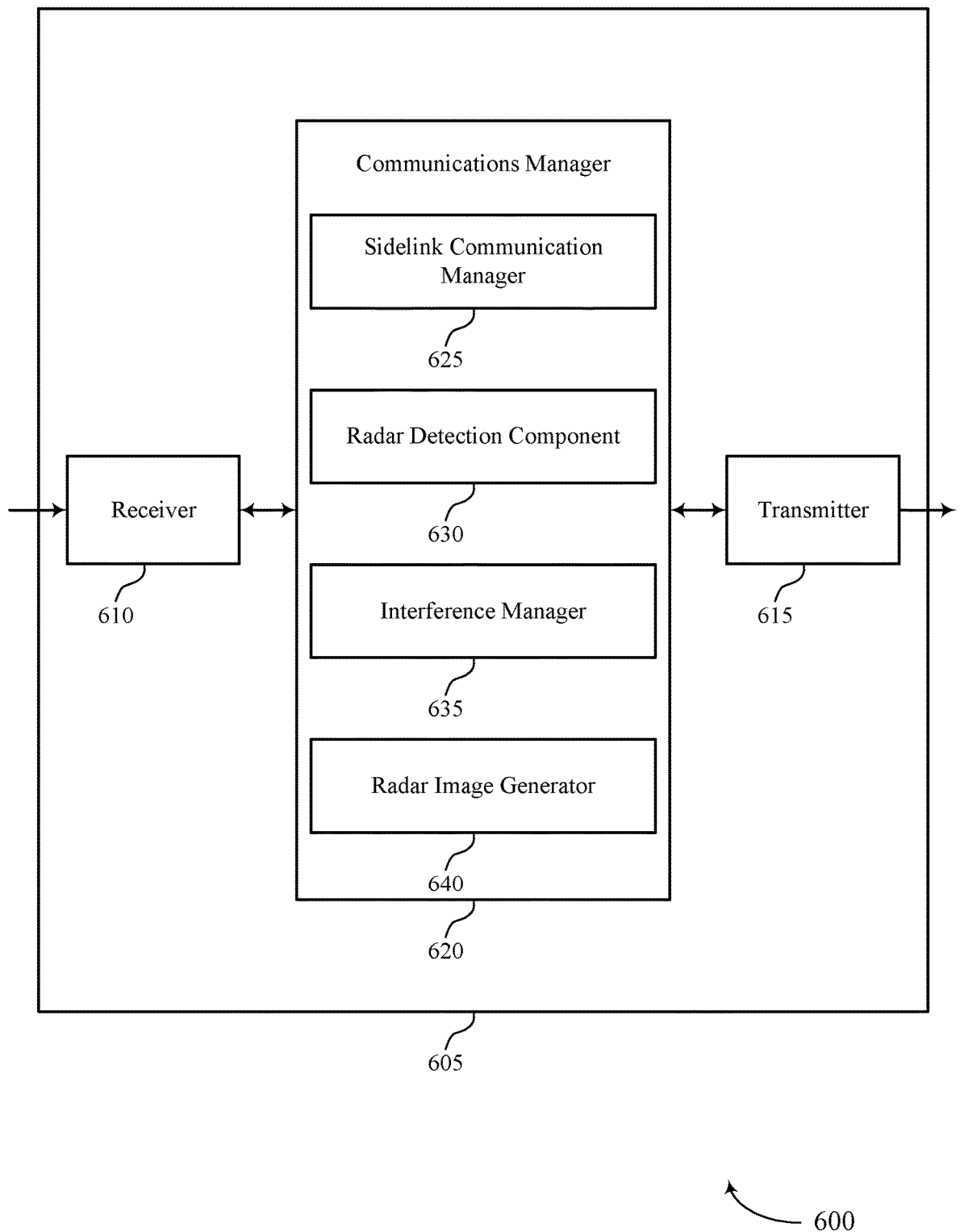

FIG. 6 shows a block diagram 600 of a device 605 that supports coordinated interference cleaning with known interferer location and timing in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to coordinated interference cleaning with known interferer location and timing). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to coordinated interference cleaning with known interferer location and timing). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of coordinated interference cleaning with known interferer location and timing as described herein. For example, the communications manager 620 may include a sidelink communication manager 625, a radar detection component 630, an interference manager 635, a radar image generator 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The sidelink communication manager 625 may be configured as or otherwise support a means for receiving an indication of a location of a second UE and an indication of one or more parameters associated with radar transmissions from the second UE. The radar detection component 630 may be configured as or otherwise support a means for receiving a radio frequency waveform including a first component associated with the radar transmissions from the second UE and a second component associated with reflected radar transmissions from the first UE. The interference manager 635 may be configured as or otherwise support a means for compensating for an interference from the first component of the received radio frequency waveform based on the location of the second UE and the one or more parameters associated with the radar transmissions from the second UE. The radar image generator 640 may be configured as or otherwise support a means for generating a radar image from the received radio frequency waveform based on compensating for the interference from the first component of the received radio frequency waveform.

Figure 7:
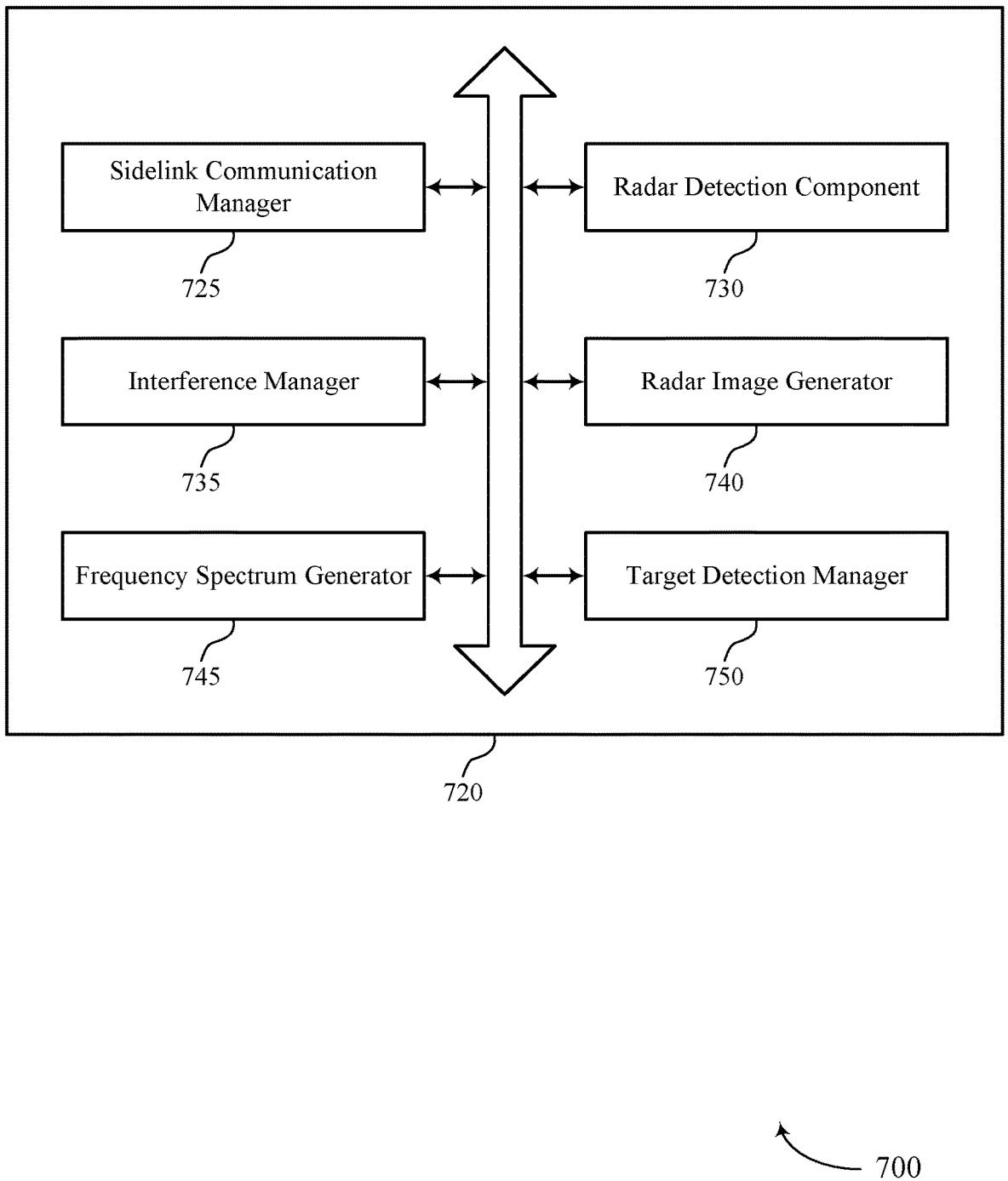
FIG. 7 shows a block diagram of a communications manager that supports coordinated interference cleaning with known interferer location and timing in accordance with aspects of the present disclosure.

FIG. 7 shows a block diagram 700 of a communications manager 720 that supports coordinated interference cleaning with known interferer location and timing in accordance with aspects of the present disclosure. The communications manager 720 may be an example of aspects of a communications manager 520, a communications manager 620, or both, as described herein. The communications manager 720, or various components thereof, may be an example of means for performing various aspects of coordinated interference cleaning with known interferer location and timing as described herein. For example, the communications manager 720 may include a sidelink communication manager 725, a radar detection component 730, an interference manager 735, a radar image generator 740, a frequency spectrum generator 745, a target detection manager 750, or any combination thereof. Each of these components may communicate, directly or indirectly, with one another (e.g., via one or more buses).

The sidelink communication manager 725 may be configured as or otherwise support a means for receiving an indication of a location of a second UE and an indication of one or more parameters associated with radar transmissions from the second UE. The radar detection component 730 may be configured as or otherwise support a means for receiving a radio frequency waveform including a first component associated with the radar transmissions from the second UE and a second component associated with reflected radar transmissions from the first UE. The interference manager 735 may be configured as or otherwise support a means for compensating for an interference from the first component of the received radio frequency waveform based on the location of the second UE and the one or more parameters associated with the radar transmissions from the second UE. The radar image generator 740 may be configured as or otherwise support a means for generating a radar image from the received radio frequency waveform based on compensating for the interference from the first component of the received radio frequency waveform.

In some examples, to support compensating for the interference, the frequency spectrum generator 745 may be configured as or otherwise support a means for generating a frequency spectrum based on the received radio frequency waveform. In some examples, to support compensating for the interference, the interference manager 735 may be configured as or otherwise support a means for identifying a portion of the frequency spectrum that includes the interference from the first component of the received radio frequency waveform based on the location of the second UE and the one or more parameters associated with the radar transmissions from the second UE. In some examples, to support compensating for the interference, the interference manager 735 may be configured as or otherwise support a means for removing the identified portion from the frequency spectrum.

In some examples, removing the identified portion from the frequency spectrum includes nulling the identified portion of the frequency spectrum.

In some examples, nulling the identified portion of the frequency spectrum includes setting values of the identified portion of the frequency spectrum to zero.

In some examples, nulling the identified portion of the frequency spectrum includes setting values of the identified portion of the frequency spectrum to a random variable based on a noise level of the frequency spectrum.

In some examples, the frequency spectrum includes a doppler frequency spectrum, a direction of arrival frequency spectrum, a range spectrum, or a combination thereof.

In some examples, the target detection manager 750 may be configured as or otherwise support a means for identifying a target based on compensating for the interference associated with the radar transmissions from the second UE.

In some examples, the reflected radar transmissions from the first UE are reflected from the target.

In some examples, the indication of the location of the second UE and the indication of the one or more parameters associated with the radar transmissions from the second UE are received via a sidelink channel.

In some examples, the indication of the location of the second UE includes global positioning system signaling from the second UE, an explicit indication of the location from the second UE, an indication of a synchronized transmission timing between the first UE and the second UE, or a combination thereof.

In some examples, the one or more parameters associated with the radar transmissions from the second UE include one or more of a frequency ramp direction of the frequency modulated continuous wave, a start frequency of the frequency modulated continuous wave, a transmission start time of the frequency modulated continuous wave, or a duration of each pulse of the frequency modulated continuous wave.

In some examples, the one or more parameters indicate a velocity of the second UE or a direction of arrival of the second UE.

In some examples, the sidelink communication manager 725 may be configured as or otherwise support a means for transmitting a frequency modulated continuous wave including a number of frequency sweep chirps.

In some examples, the reflected radar transmissions from the first UE include a reflection of the number of frequency sweep chirps.

Figure 8:
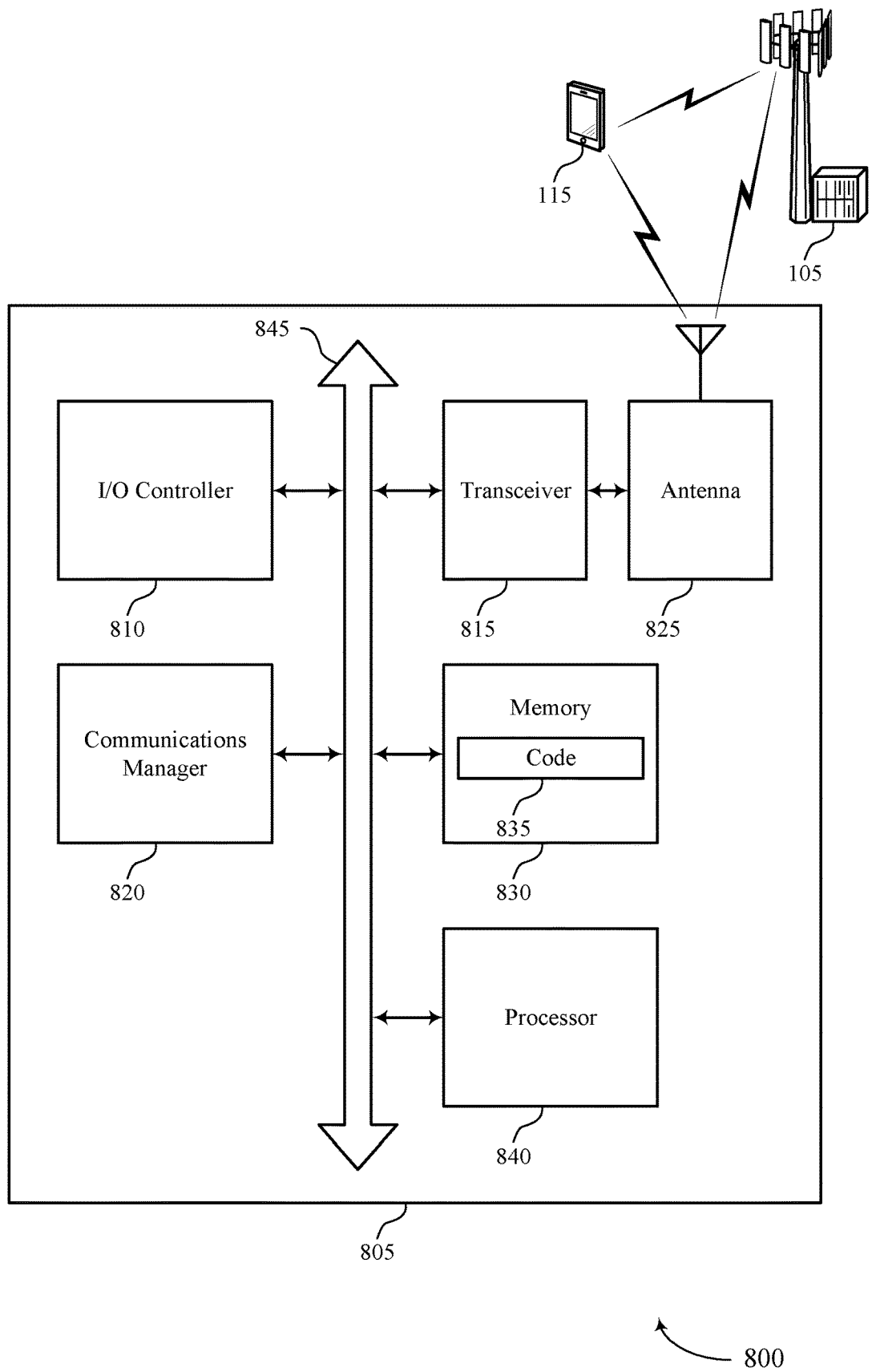
FIG. 8 shows a diagram of a system including a device that supports coordinated interference cleaning with known interferer location and timing in accordance with aspects of the present disclosure.

FIG. 8 shows a diagram of a system 800 including a device 805 that supports coordinated interference cleaning with known interferer location and timing in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting coordinated interference cleaning with known interferer location and timing). For example, the device 805 or a component of the device 805 may include a processor 840 and memory 830 coupled to the processor 840, the processor 840 and memory 830 configured to perform various functions described herein.

For example, the communications manager 820 may be configured as or otherwise support a means for receiving an indication of a location of a second UE and an indication of one or more parameters associated with radar transmissions from the second UE. The communications manager 820 may be configured as or otherwise support a means for receiving a radio frequency waveform including a first component associated with the radar transmissions from the second UE and a second component associated with reflected radar transmissions from the first UE. The communications manager 820 may be configured as or otherwise support a means for compensating for an interference from the first component of the received radio frequency waveform based on the location of the second UE and the one or more parameters associated with the radar transmissions from the second UE. The communications manager 820 may be configured as or otherwise support a means for generating a radar image from the received radio frequency waveform based on compensating for the interference from the first component of the received radio frequency waveform.

By including or configuring the communications manager 820 in accordance with examples as described herein, the device 805 may support techniques for improved coordination between devices. Based on receiving the indication of the location of the second UE and an indication of one or more parameters associated with radar transmissions from the second UE, the processor 840 may efficiently identifying one or more portions of the frequency spectrum that include the interference from the received radio frequency waveform. The processor of the UE 115 may turn on one or more processing units for receiving the indications, increase a processing clock, or a similar mechanism within the UE 115. As such, when the indications are received, the processor 840 may be ready to respond more efficiently through the reduction of a ramp up in processing power.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of coordinated interference cleaning with known interferer location and timing as described herein, or the processor 840 and the memory 830 may be otherwise configured to perform or support such operations.

Figure 9:
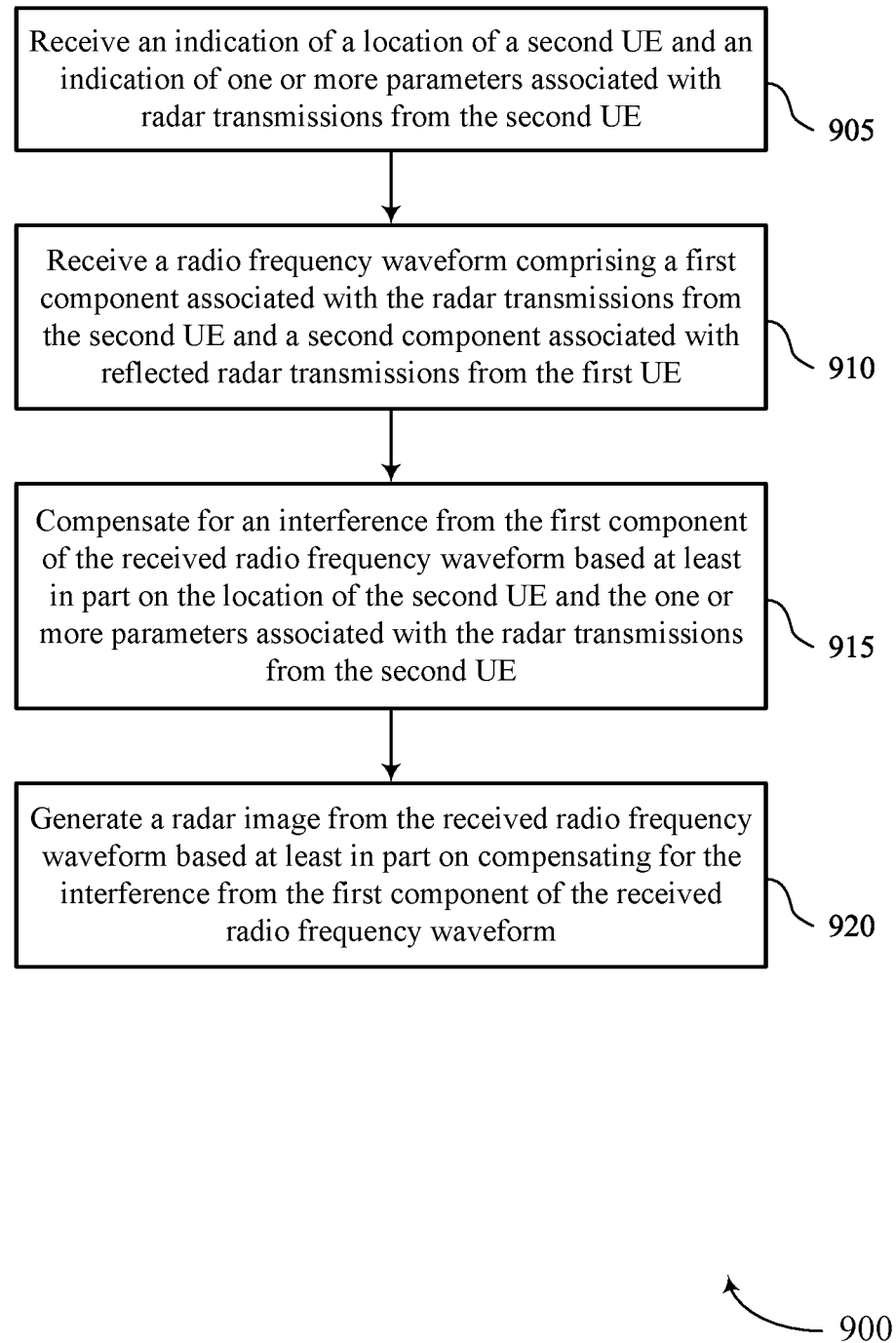
FIGS. 9 through 11 show flowcharts illustrating methods that support coordinated interference cleaning with known interferer location and timing in accordance with aspects of the present disclosure.

FIG. 9 shows a flowchart illustrating a method 900 that supports coordinated interference cleaning with known interferer location and timing in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include receiving an indication of a location of a second UE and an indication of one or more parameters associated with radar transmissions from the second UE. The operations of 905 may be performed in accordance with examples as disclosed herein. In some examples, aspects of the operations of 905 may be performed by a sidelink communication manager 725 as described with reference to FIG. 7.

At 910, the method may include receiving a radio frequency waveform including a first component associated with the radar transmissions from the second UE and a second component associated with reflected radar transmissions from the first UE. The operations of 910 may be performed in accordance with examples as disclosed herein. In some examples, aspects of the operations of 910 may be performed by a radar detection component 730 as described with reference to FIG. 7.

At 915, the method may include compensating for an interference from the first component of the received radio frequency waveform based on the location of the second UE and the one or more parameters associated with the radar transmissions from the second UE. The operations of 915 may be performed in accordance with examples as disclosed herein. In some examples, aspects of the operations of 915 may be performed by an interference manager 735 as described with reference to FIG. 7.

At 920, the method may include generating a radar image from the received radio frequency waveform based on compensating for the interference from the first component of the received radio frequency waveform. The operations of 920 may be performed in accordance with examples as disclosed herein. In some examples, aspects of the operations of 920 may be performed by a radar image generator 740 as described with reference to FIG. 7.

Figure 10:
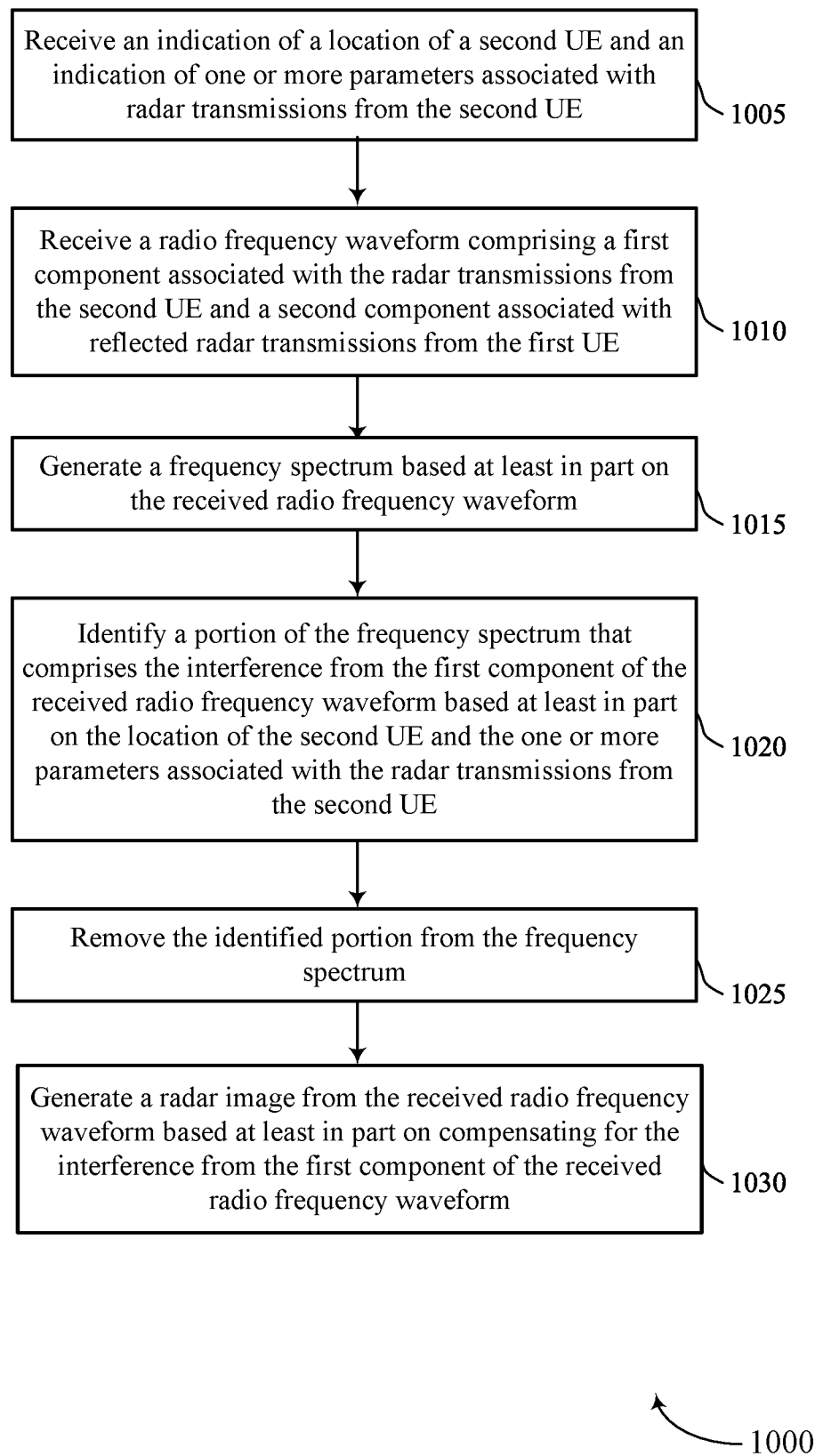

FIG. 10 shows a flowchart illustrating a method 1000 that supports coordinated interference cleaning with known interferer location and timing in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include receiving an indication of a location of a second UE and an indication of one or more parameters associated with radar transmissions from the second UE. The operations of 1005 may be performed in accordance with examples as disclosed herein. In some examples, aspects of the operations of 1005 may be performed by a sidelink communication manager 725 as described with reference to FIG. 7.

At 1010, the method may include receiving a radio frequency waveform including a first component associated with the radar transmissions from the second UE and a second component associated with reflected radar transmissions from the first UE. The operations of 1010 may be performed in accordance with examples as disclosed herein. In some examples, aspects of the operations of 1010 may be performed by a radar detection component 730 as described with reference to FIG. 7.

At 1015, the method may include generating a frequency spectrum based on the received radio frequency waveform. The operations of 1015 may be performed in accordance with examples as disclosed herein. In some examples, aspects of the operations of 1015 may be performed by a frequency spectrum generator 745 as described with reference to FIG. 7.

At 1020, the method may include identifying a portion of the frequency spectrum that includes the interference from the first component of the received radio frequency waveform based on the location of the second UE and the one or more parameters associated with the radar transmissions from the second UE. The operations of 1020 may be performed in accordance with examples as disclosed herein. In some examples, aspects of the operations of 1020 may be performed by an interference manager 735 as described with reference to FIG. 7.

At 1025, the method may include removing the identified portion from the frequency spectrum. The operations of 1025 may be performed in accordance with examples as disclosed herein. In some examples, aspects of the operations of 1025 may be performed by an interference manager 735 as described with reference to FIG. 7.

At 1030, the method may include generating a radar image from the received radio frequency waveform based on compensating for the interference from the first component of the received radio frequency waveform. The operations of 1030 may be performed in accordance with examples as disclosed herein. In some examples, aspects of the operations of 1030 may be performed by a radar image generator 740 as described with reference to FIG. 7.

Figure 11:
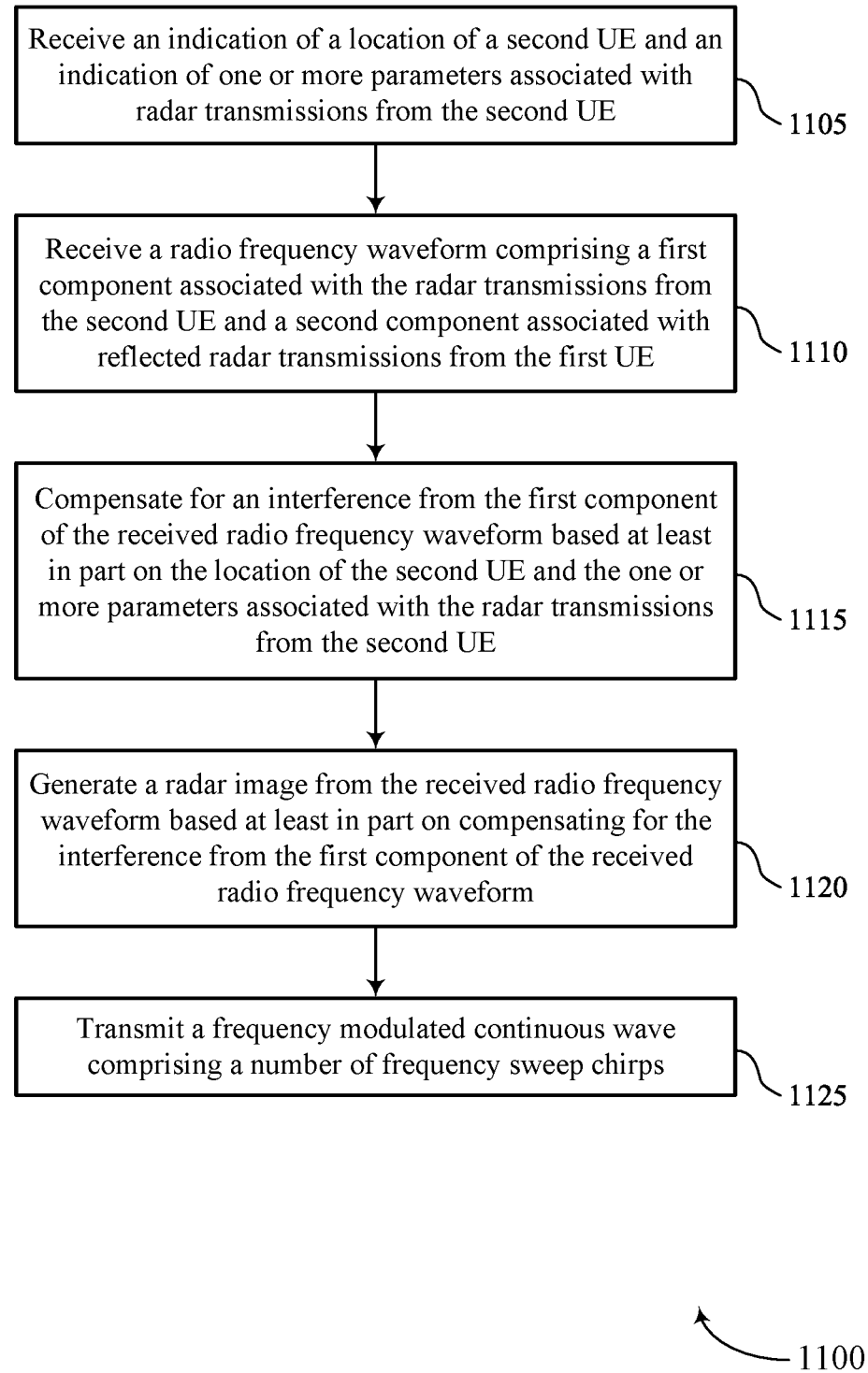

FIG. 11 shows a flowchart illustrating a method 1100 that supports coordinated interference cleaning with known interferer location and timing in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include receiving an indication of a location of a second UE and an indication of one or more parameters associated with radar transmissions from the second UE. The operations of 1105 may be performed in accordance with examples as disclosed herein. In some examples, aspects of the operations of 1105 may be performed by a sidelink communication manager 725 as described with reference to FIG. 7.

At 1110, the method may include receiving a radio frequency waveform including a first component associated with the radar transmissions from the second UE and a second component associated with reflected radar transmissions from the first UE. The operations of 1110 may be performed in accordance with examples as disclosed herein. In some examples, aspects of the operations of 1110 may be performed by a radar detection component 730 as described with reference to FIG. 7.

At 1115, the method may include compensating for an interference from the first component of the received radio frequency waveform based on the location of the second UE and the one or more parameters associated with the radar transmissions from the second UE. The operations of 1115 may be performed in accordance with examples as disclosed herein. In some examples, aspects of the operations of 1115 may be performed by an interference manager 735 as described with reference to FIG. 7.

At 1120, the method may include generating a radar image from the received radio frequency waveform based on compensating for the interference from the first component of the received radio frequency waveform. The operations of 1120 may be performed in accordance with examples as disclosed herein. In some examples, aspects of the operations of 1120 may be performed by a radar image generator 740 as described with reference to FIG. 7.

At 1125, the method may include transmitting a frequency modulated continuous wave including a number of frequency sweep chirps. The operations of 1125 may be performed in accordance with examples as disclosed herein. In some examples, aspects of the operations of 1125 may be performed by a sidelink communication manager 725 as described with reference to FIG. 7.

The following provides an overview of aspects of the present disclosure:

Aspect 1: A method of wireless communication at a first UE, comprising: receiving an indication of a location of a second UE and an indication of one or more parameters associated with radar transmissions from the second UE; receiving a radio frequency waveform comprising a first component associated with the radar transmissions from the second UE and a second component associated with reflected radar transmissions from the first UE; compensating for an interference from the first component of the received radio frequency waveform based at least in part on the location of the second UE and the one or more parameters associated with the radar transmissions from the second UE; and generating a radar image from the received radio frequency waveform based at least in part on compensating for the interference from the first component of the received radio frequency waveform.

Aspect 2: The method of aspect 1, wherein compensating for the interference further comprises: generating a frequency spectrum based at least in part on the received radio frequency waveform; identifying a portion of the frequency spectrum that comprises the interference from the first component of the received radio frequency waveform based at least in part on the location of the second UE and the one or more parameters associated with the radar transmissions from the second UE; and removing the identified portion from the frequency spectrum.

Aspect 3: The method of aspect 2, wherein removing the identified portion from the frequency spectrum comprises nulling the identified portion of the frequency spectrum.

Aspect 4: The method of aspect 3, wherein nulling the identified portion of the frequency spectrum comprises setting values of the identified portion of the frequency spectrum to zero.

Aspect 5: The method of any of aspects 3 through 4, wherein nulling the identified portion of the frequency spectrum comprises setting values of the identified portion of the frequency spectrum to a random variable based on a noise level of the frequency spectrum.

Aspect 6: The method of any of aspects 2 through 5, wherein the frequency spectrum comprises a doppler frequency spectrum, a direction of arrival frequency spectrum, a range spectrum, or a combination thereof.

Aspect 7: The method of any of aspects 1 through 6, further comprising: identifying a target based at least in part on compensating for the interference associated with the radar transmissions from the second UE.

Aspect 8: The method of aspect 7, wherein the reflected radar transmissions from the first UE are reflected from the target.

Aspect 9: The method of any of aspects 1 through 8, wherein the indication of the location of the second UE and the indication of the one or more parameters associated with the radar transmissions from the second UE are received via a sidelink channel.

Aspect 10: The method of any of aspects 1 through 9, wherein the indication of the location of the second UE comprises global positioning system signaling from the second UE, an explicit indication of the location from the second UE, an indication of a synchronized transmission timing between the first UE and the second UE, or a combination thereof.

Aspect 11: The method of any of aspects 1 through 10, wherein the radar transmissions from the second UE comprise a frequency modulated continuous wave and the one or more parameters associated with the radar transmissions from the second UE comprise one or more of a frequency ramp direction of the frequency modulated continuous wave, a start frequency of the frequency modulated continuous wave, a transmission start time of the frequency modulated continuous wave, or a duration of each pulse of the frequency modulated continuous wave.

Aspect 12: The method of aspect 11, wherein the one or more parameters indicate a velocity of the second UE or a direction of arrival of the second UE.

Aspect 13: The method of any of aspects 1 through 12, further comprising: transmitting a frequency modulated continuous wave comprising a number of frequency sweep chirps.

Aspect 14: The method of aspect 13, wherein the reflected radar transmissions from the first UE comprise a reflection of the number of frequency sweep chirps.

Aspect 15: An apparatus comprising a processor; memory coupled with the processor; and instructions stored in the memory and executable by the processor to cause the apparatus to perform a method of any of aspects 1 through 14.

Aspect 16: An apparatus comprising at least one means for performing a method of any of aspects 1 through 14.

Aspect 17: A non-transitory computer-readable medium storing code the code comprising instructions executable by a processor to perform a method of any of aspects 1 through 14.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method of wireless communication at a first user equipment (UE), comprising:
   receiving an indication of a location of a second UE and an indication of one or more parameters associated with radar transmissions from the second UE;
   receiving a radio frequency waveform comprising a first component associated with the radar transmissions from the second UE and a second component associated with reflected radar transmissions from the first UE;
   compensating for an interference from the first component of the received radio frequency waveform based at least in part on the location of the second UE and the one or more parameters associated with the radar transmissions from the second UE, wherein compensating for the interference comprises:
      generating a frequency spectrum based at least in part on the received radio frequency waveform; and
      identifying, after the generating, a portion of the generated frequency spectrum that comprises the interference from the first component of the received radio frequency waveform based at least in part on the location of the second UE and the one or more parameters associated with the radar transmissions from the second UE; and
   generating a radar image from the received radio frequency waveform based at least in part on compensating for the interference from the first component of the received radio frequency waveform.

2. The method of claim 1, wherein compensating for the interference further comprises:
   removing the identified portion from the generated frequency spectrum.

3. The method of claim 2, wherein removing the identified portion from the generated frequency spectrum comprises nulling the identified portion of the generated frequency spectrum.

4. The method of claim 3, wherein nulling the identified portion of the generated frequency spectrum comprises setting values of the identified portion of the generated frequency spectrum to zero.

5. The method of claim 3, wherein nulling the identified portion of the generated frequency spectrum comprises setting values of the identified portion of the frequency spectrum to a random variable based on a noise level of the frequency spectrum.

6. The method of claim 1, wherein the generated frequency spectrum comprises a doppler frequency spectrum, a direction of arrival frequency spectrum, a range spectrum, or a combination thereof.

7. The method of claim 1, further comprising:
   identifying a target based at least in part on compensating for the interference associated with the radar transmissions from the second UE.

8. The method of claim 7, wherein the reflected radar transmissions from the first UE are reflected from the target.

9. The method of claim 1, wherein the indication of the location of the second UE and the indication of the one or more parameters associated with the radar transmissions from the second UE are received via a sidelink channel.

10. The method of claim 1, wherein the indication of the location of the second UE comprises global positioning system signaling from the second UE, an explicit indication of the location from the second UE, an indication of a synchronized transmission timing between the first UE and the second UE, or a combination thereof.

11. The method of claim 1, wherein the radar transmissions from the second UE comprise a frequency modulated continuous wave and wherein the one or more parameters associated with the radar transmissions from the second UE comprise one or more of a frequency ramp direction of the frequency modulated continuous wave, a start frequency of the frequency modulated continuous wave, a transmission start time of the frequency modulated continuous wave, or a duration of each pulse of the frequency modulated continuous wave.

12. The method of claim 11, wherein the one or more parameters indicate a velocity of the second UE or a direction of arrival of the second UE.

13. The method of claim 1, further comprising:
   transmitting a frequency modulated continuous wave comprising a quantity of frequency sweep chirps.

14. The method of claim 13, wherein the reflected radar transmissions from the first UE comprise a reflection of the quantity of frequency sweep chirps.

15. An apparatus for wireless communication at a first user equipment (UE), comprising:
   a processor;
   memory coupled with the processor; and
   instructions stored in the memory and executable by the processor to cause the apparatus to:
      receive an indication of a location of a second UE and an indication of one or more parameters associated with radar transmissions from the second UE;
      receive a radio frequency waveform comprising a first component associated with the radar transmissions from the second UE and a second component associated with reflected radar transmissions from the first UE;
      compensate for an interference from the first component of the received radio frequency waveform based at least in part on the location of the second UE and the one or more parameters associated with the radar transmissions from the second UE, wherein the instructions to compensate for the interference are executable by the processor to cause the apparatus to:
         generate a frequency spectrum based at least in part on the received radio frequency waveform; and
         identify, after the generating, a portion of the generated frequency spectrum that comprises the interference from the first component of the received radio frequency waveform based at least in part on the location of the second UE and the one or more parameters associated with the radar transmissions from the second UE; and
      generate a radar image from the received radio frequency waveform based at least in part on compensating for the interference from the first component of the received radio frequency waveform.

16. The apparatus of claim 15, wherein the instructions to compensate for the interference are further executable by the processor to cause the apparatus to:
remove the identified portion from the generated frequency spectrum.

17. The apparatus of claim 16, wherein removing the identified portion from the generated frequency spectrum comprises nulling the identified portion of the generated frequency spectrum.

18. The apparatus of claim 17, wherein nulling the identified portion of the generated frequency spectrum comprises setting values of the identified portion of the generated frequency spectrum to zero.

19. The apparatus of claim 17, wherein nulling the identified portion of the generated frequency spectrum comprises setting values of the identified portion of the generated frequency spectrum to a random variable based on a noise level of the frequency spectrum.

20. The apparatus of claim 15, wherein the generated frequency spectrum comprises a doppler frequency spectrum, a direction of arrival frequency spectrum, a range spectrum, or a combination thereof.

21. The apparatus of claim 15, wherein the instructions are further executable by the processor to cause the apparatus to:
identify a target based at least in part on compensating for the interference associated with the radar transmissions from the second UE.

22. The apparatus of claim 21, wherein the reflected radar transmissions from the first UE are reflected from the target.

23. The apparatus of claim 15, wherein the indication of the location of the second UE and the indication of the one or more parameters associated with the radar transmissions from the second UE are received via a sidelink channel.

24. The apparatus of claim 15, wherein the indication of the location of the second UE comprises global positioning system signaling from the second UE, an explicit indication of the location from the second UE, an indication of a synchronized transmission timing between the first UE and the second UE, or a combination thereof.

25. The apparatus of claim 15, wherein the radar transmissions from the second UE comprise a frequency modulated continuous wave and wherein the one or more parameters associated with the radar transmissions from the second UE comprise one or more of a frequency ramp direction of the frequency modulated continuous wave, a start frequency of the frequency modulated continuous wave, a transmission start time of the frequency modulated continuous wave, or a duration of each pulse of the frequency modulated continuous wave.

26. The apparatus of claim 25, wherein the one or more parameters indicate a velocity of the second UE or a direction of arrival of the second UE.

27. The apparatus of claim 15, wherein the instructions are further executable by the processor to cause the apparatus to:
transmit a frequency modulated continuous wave comprising a quantity of frequency sweep chirps.

28. The apparatus of claim 27, wherein the reflected radar transmissions from the first UE comprise a reflection of the quantity of frequency sweep chirps.

29. An apparatus for wireless communication at a first user equipment (UE), comprising:
means for receiving an indication of a location of a second UE and an indication of one or more parameters associated with radar transmissions from the second UE;
means for receiving a radio frequency waveform comprising a first component associated with the radar transmissions from the second UE and a second component associated with reflected radar transmissions from the first UE;
means for compensating for an interference from the first component of the received radio frequency waveform based at least in part on the location of the second UE and the one or more parameters associated with the radar transmissions from the second UE, wherein the means for compensating for the interference comprise:
means for generating a frequency spectrum based at least in part on the received radio frequency waveform; and
means for identifying, after the generating, a portion of the generated frequency spectrum that comprises the interference from the first component of the received radio frequency waveform based at least in part on the location of the second UE and the one or more parameters associated with the radar transmissions from the second UE; and
means for generating a radar image from the received radio frequency waveform based at least in part on compensating for the interference from the first component of the received radio frequency waveform.

30. A non-transitory computer-readable medium storing code at a first user equipment (UE), the code comprising instructions executable by a processor to:
receive an indication of a location of a second UE and an indication of one or more parameters associated with radar transmissions from the second UE;
receive a radio frequency waveform comprising a first component associated with the radar transmissions from the second UE and a second component associated with reflected radar transmissions from the first UE;
compensate for an interference from the first component of the received radio frequency waveform based at least in part on the location of the second UE and the one or more parameters associated with the radar transmissions from the second UE, wherein the code comprising instructions executable by the processor to compensate for the interference comprises instructions executable by a processor to:
generate a frequency spectrum based at least in part on the received radio frequency waveform; and
identify, after the generating, a portion of the generated frequency spectrum that comprises the interference from the first component of the received radio frequency waveform based at least in part on the location of the second UE and the one or more parameters associated with the radar transmissions from the second UE; and
generate a radar image from the received radio frequency waveform based at least in part on compensating for the interference from the first component of the received radio frequency waveform.

* * * * *